Sept. 8, 1970 J. MERCIER 3,527,820
PRODUCTION OF ALKYL CHLORIDES CONTAINING FROM
3 TO 6 CARBON ATOMS
Filed Oct. 19, 1967 2 Sheets-Sheet 1
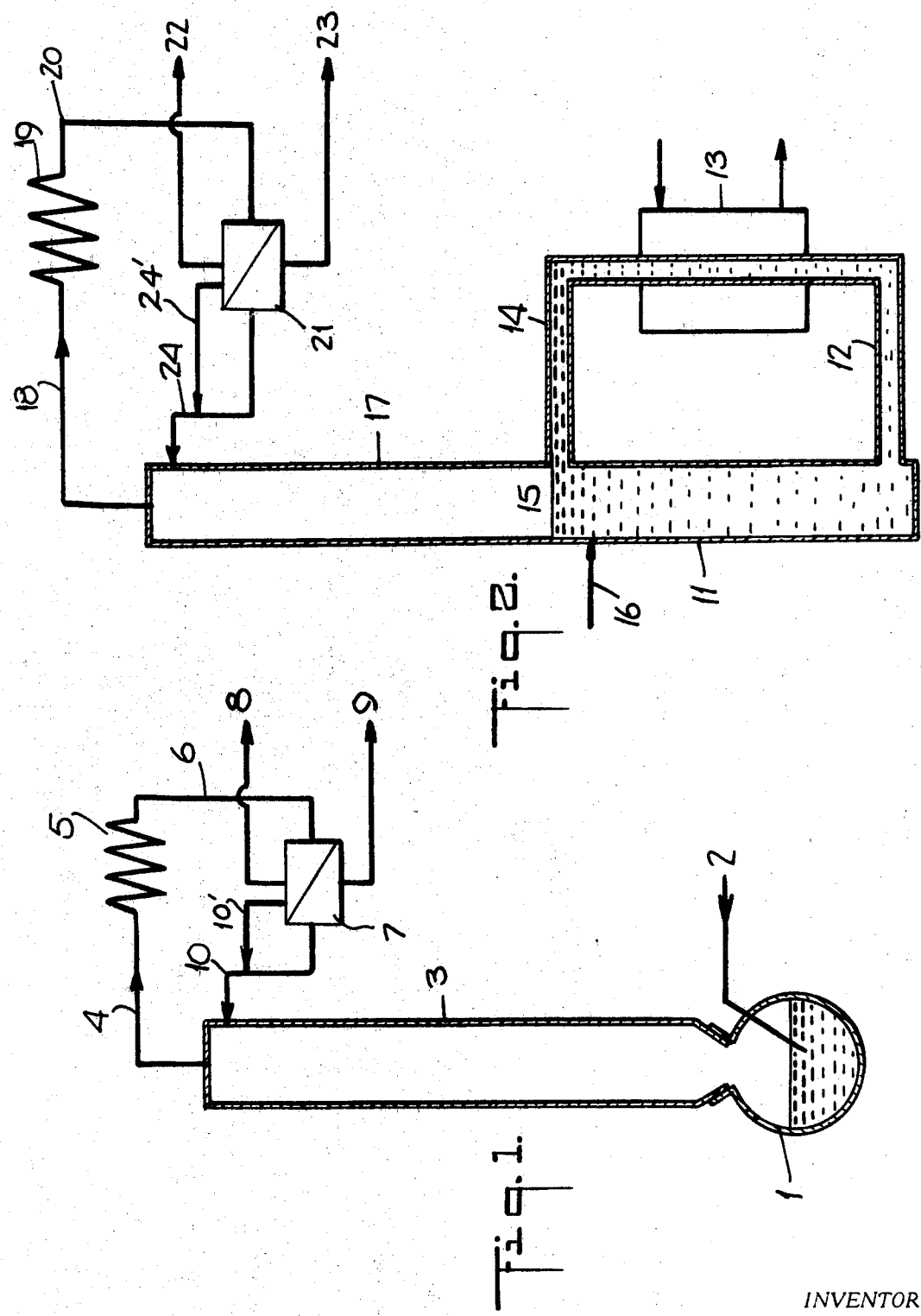
INVENTOR.
JULES MERCIER
BY
Ward, Haselton, McEllwain, Bockm Litzata
ATTORNEYS United States Patent Office 3,527,820
Patented Sept. 8, 1970

3,527,820
PRODUCTION OF ALKYL CHLORIDES CONTAINING FROM 3 TO 6 CARBON ATOMS
Jules Mercier, Melle, Deux-Sevres, France, assignor to Melle-Bezons, Melle, Deux-Sevres, France a corporation of France
Continuation-in-part of application Ser. No. 331,003, Dec. 16, 1963. This application Oct. 19, 1967, Ser. No. 676,587
Int. Cl. C07c 17/16
U.S. Cl. 260—657                    11 Claims

ABSTRACT OF THE DISCLOSURE

This application discloses a continuous process for the production of alkyl chlorides by reaction at an elevated temperature between an alkanol containing from 3 to 6 carbon atoms and hydrochloric acid.

---

Figure 3:
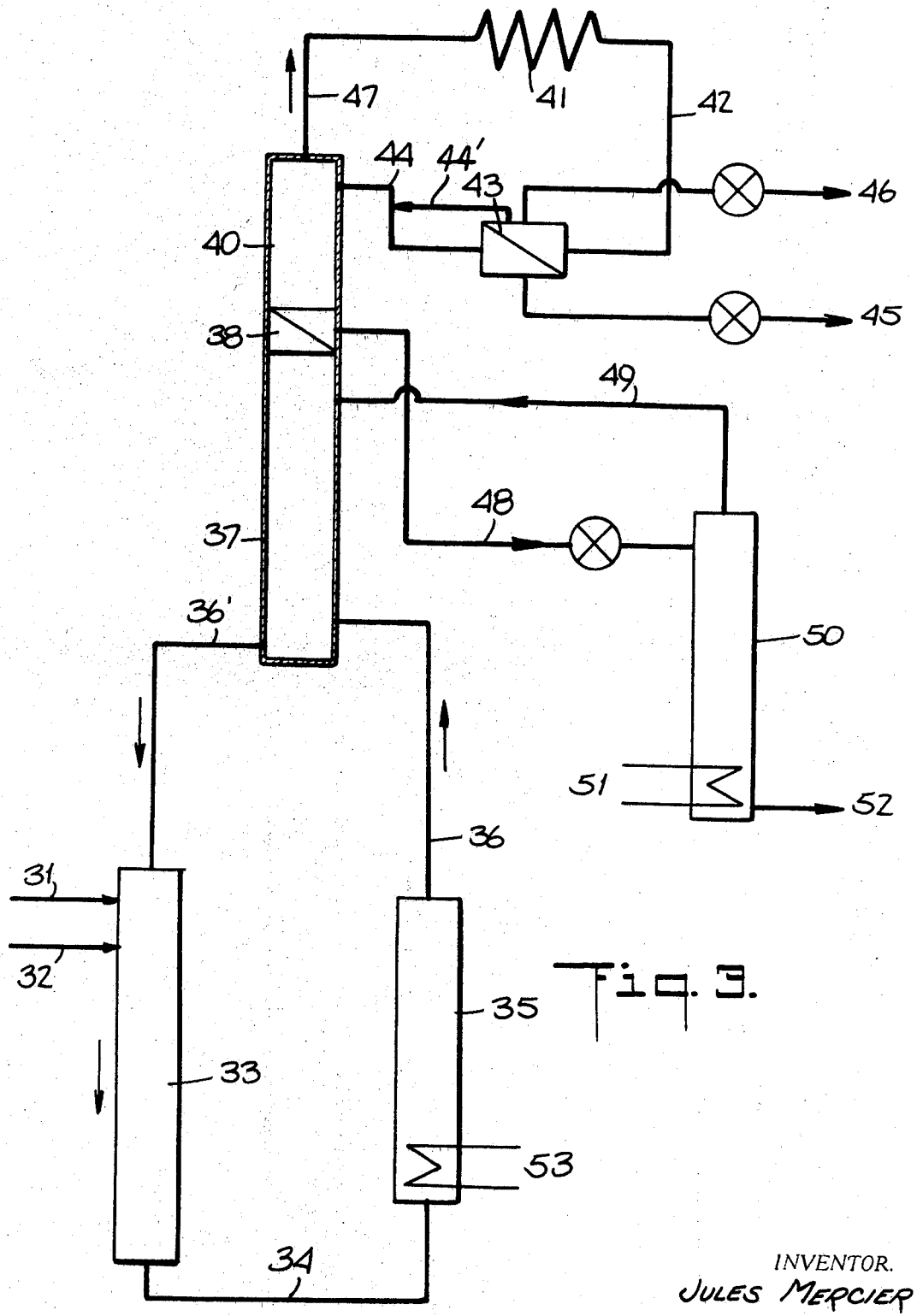

This application is a continuation-in-part of copending application Ser. No. 331,003, filed Dec. 16, 1963, now abandoned.

This invention relates to the continuous production of alkyl chlorides containing from three to six carbon atoms in a catalyst free reaction mixture. In a preferred aspect the reaction takes place in a reaction apparatus set up as a closed circuit.

The principal object of the invention is the continuous production and recovery of the alkyl halides aforesaid in a facile, efficient manner.

The reaction of alkanols such as n-butanol with aqueous hydrochloric acid at elevated temperatures, suitably the boiling point of the mixture, is a low-speed esterification reaction. Normally it is carried out by boiling the reaction mixture in a reaction vessel fitted with a distillation column adjusted so that a portion of the distilled products reflux and the balance containing the desired chloride is condensed and collected. The condensate is a heterogeneous mixture which separates to permit collection of the alkyl halide. A portion of the condensate may be returned to the distillation column, if desired.

To increase the reaction velocity, it is customary to add soluble inorganic catalysts, of which zinc chloride is one example, to the reaction mixture. The effect of the addition of zinc chloride, which should be employed in high proportion, is to increase the boiling point of the reaction mixture, and thereby to increase the reaction velocity.

Catalysts of this type, however, suffer from various disadvantages. Specifically zinc chloride causes formation of appreciable proportions of secondary butyl chloride which is undesirable in many instances where pure normal butyl chloride is required. Moreover, zinc chloride exerts a dehydrating effect upon butanol and similar alcohols which results in the formation of relatively large proportions of the corresponding ether, olefine, and high boiling tars. This effect is also observed where the esterification is carried out with dry hydrogen chloride.

It has now been found that it is possible by maintaining a relatively high proportion of water in the reaction bath to alleviate the above mentioned problems and to obtain improvements in both reaction velocity and in yield, without the necessity of employing a catalyst. This is a most unexpected discovery since normally the presence of a product of the reaction, in this case water, inhibits the reaction.

The invention provides a continuous process for the production and recovery of alkyl chlorides containing from three to six carbon atoms by esterification of the corresponding alkanol with aqueous hydrochloric acid in the liquid phase. Reaction is effected by passing a catalyst-free, vapor-free reaction mixture containing from about 38% to 60% by weight of the selected alkanol, from about 10% to 17%, by weight, hydrogen chloride, and from about 30% to 45%, by weight, water, all based on the total weight of the mixture, at a temperature of from about 100° C. to 150° C. through a reaction zone in an apparatus adapted to permit continuous withdrawal of aliquots of the reaction mixture containing the desired products, any by-products and starting materials, as well as continuous addition of reactants to the reaction zone. It has been found that under these conditions it is possible to maintain the hydrochloric acid at a high enough concentration to attain desirable reaction velocities while at the same time maintaining sufficient water in the liquid phase to reduce the secondary reactions of ether and olefin formation from the alcohol. The portion of the reaction mixture which is withdrawn from the reaction zone contains unreacted starting materials and water as well as the desired product. It often will contain recoverable quantities of ether. It is partially vaporized to permit the separation of the desired alkyl halide, and possibly ether, as well as selected amount of water as vapors. The remaining nonvaporized portion, at a temperature of from about 100° C. to 150° C., is returned as a vapor-free liquid phase to the reaction zone. The alkyl halide, water and ether vapor mixture can be separated into its constituents by selective condensation utilizing suitable distillation techniques.

It has been found in accordance with the present invention that, in contrast with what would be expected, it is more advantageous to separate the reaction stage from the distillation stage than to separate the vapors formed in the reaction directly from the reaction stage, that is, to carry out the reaction and the collection of reaction product vapors in the same stage. This is most surprising since it is generally recognized that the evolution of reaction product vapors in situ during the reaction favors the displacement of the reaction equilibrium towards the production of products.

This unexpected advantage of the invention will be better understood by reference to the figures in which FIG. 1 diagrammatically illustrates the conventional method and apparatus for the continuous esterification of an alcohol with hydrochloric acid, and FIG. 2 illustrates one embodiment of the apparatus and method of this invention.

In the apparatus of FIG. 1, a round bottom flask 1, of a capacity of, for example, two liters, is initially charged with one liter of a reaction mixture comprising an alkanol and aqueous hydrochloric acid. The reaction mixture is brought to the boiling point while fresh reaction mixture is continuously fed through pipe 2. The vapors formed in the reaction are continuously fractionated in rectifying column 3. The head vapors issuing from column 3 through pipe 4 are condensed in condenser 5 and conducted through pipe 6 to decanter 7 where the condensate separates into two layers, an upper organic layer containing mostly alkyl halide and a lower aqueous layer. Per unit of time, an amount of upper layer corresponding to the amount of alkyl chloride produced is withdrawn by pipe 8 and an amount of lower layer corresponding to the amount of reaction water formed is wtihdrawn by pipe 9. The remainder of the condensate is refluxed to the top of column 3 through pipes 10 and 10'.

FIG. 2 illustrates a closed reaction circuit such as can be employed in the practice of this invention. The reaction zone, which in FIG. 1 was a round bottom flask, in this instance is an elongated cylinder or column 11. The column 11 may be, for example, one meter in height with an inner diameter of 3.5 centimeters. The bottom of the reaction column is connected through pipe 12 to a vaporizer or emulsifier 13, the top of which is connected through pipe 14 to the top portion 15 of column 11. The reaction circuit constituted by items 11, 12, 13, and 14 is filled with one liter of the same starting reaction mixture as the round bottom flask of FIG. 1. Vaporizer 13 is heated, for example, by steam from a steam source, not shown, and the mixture flowing through it is partially vaporized. There is thus formed in vaporizer 13 an emulsion of the formed vapors in the remaining liquid phase. The decrease in the specific weight of the mixture, due to the formation of vapors and emulsification thereof which takes place in vaporizer 13, causes the mixture to flow upwards and causes circulation of the mixture in the circuit.

The vapors emulsified in the reaction liquid are evolved and separated from the liquid phase in the top portion 15 of column 11, and the remaining liquid phase returns in vapor-free state to the reaction zone. Fresh reactants are continuously fed to the reaction zone by pipe 16 at a level below that at which the vapors have separated. Column 11 is surmounted by a rectifying column 17 which receives and fractionates the vapors. Column 17 is equipped with a head pipe 18, a condenser 19, a condensate pipe 20, a decanter 21, an upper layer withdrawal pipe 22, a lower layer withdrawal pipe 23, and reflux pipes 24 and 24' which perform the same functions as the analogous portions of the apparatus illustrated in FIG. 1.

When carrying out the process of this invention in the apparatus illustrated in FIG. 2 under exactly the same conditions with respect to composition, pressure, temperature, heat supply, etc. as utilized in the conventional process in the apparatus illustrated in FIG. 1, the amount of alkyl chloride produced per unit volume of the liquid phase and per unit time is from 2 to 3 times as high as produced in the apparatus of FIG. 1.

As used in this application the terms "top" and "bottom" do not necessarily mean the actual top or bottom of a particular apparatus or portion of apparatus. The terms include those segments which are close to the actual tops or bottoms.

While this invention is not limited by theory, it appears possible that the reaction proceeds through the formation of an intermediate complex addition compound of the formula ROH·HCl in which R is the alkyl radical of the alcohol. The stability of this complex decreases with increasing temperature and the complex tends to decompose with displacement of the equilibrium towards hydrogen chloride formation. This inhibits formation of the desired products. Accordingly, it is most advantageous to lengthen the life of the complex by effecting reaction in the liquid phase in the absence of direct vapor evolution from the reaction zone.

As aforesaid, the concentrations of alcohol, hydrogen chloride and water are 38–60%, 10–17%, and 30–45%, respectively. It is thus seen that the reaction bath contains an aqueous solution of hydrochloric acid the apparent concentration of which is from about 18% to 36% calculated as follows:

$$\frac{HCl}{HCl+H_2O} = \frac{10}{10+45} = 18\%$$

$$\frac{HCl}{HCl+H_2O} = \frac{17}{17+30} = 36\%$$

This concentration is only apparent since some of the hydrogen chloride is tied up in the above described complex.

It has been noted that the acid strength of the aqueous solution generally increases with increasing alcohol concentration in the starting mixture. In most cases it is above that of the azeotropic mixture of water and hydrochloric acid which contains only 20.5% by weight, of acid.

It has further been noted that under the operating conditions disclosed the production rate depends upon the alcohol and hydrogen chloride contents of the bath. An easy and rapid method of determining the alcohol content comprises neutralizing an aliquot from the bath by means of a concentrated aqueous solution of sodium hydroxide (20–25% by weight), and measuring the volume of the organic phase which separates.

The control of the water concentration in the reaction zone which is a feature of this invention makes it possible to use hydrochloric acid of any available concentration for the production of alkyl chlorides. Dry gaseous hydrogen chloride may be utilized as may commercial 35%, by weight, hydrochloric acid or aqueous solutions materially below that concentration including, for example, by-product hydrochloric acid solutions from various industrial processes. The yield of product is not materially affected by the source of hydrogen chloride.

The amount of heat which should be supplied to the apparatus depends mainly on the amount of water which should be distilled off to keep the water and hydrogen chloride content of the reaction mixture at acceptable levels. Accordingly, the amount of heat required for efficient operation varies with the selected source of hydrogen chloride, i.e. dry hydrogen chloride gas or aqueous hydrochloric acid of various concentrations.

The reaction temperature normally varies from about 100° C. to 150° C., and the preferred temperature will vary principally with the composition of the reaction mixture and the pressure at which the reaction is carried out. Atmospheric pressure is convenient, but generally better results are realized in the preferred operating range of from 1 to 4 kg./cm.$^2$ above atmospheric pressure. Higher pressures result in higher operating temperatures within the defined range and this in turn causes higher reaction velocities and permits the use of smaller reactors. Thus, the operating pressures generally vary from about 1 to 5 kg./cm.$^2$ absolute.

The reaction zone may be a container of any convenient shape, but best results are obtained utilizing a vertical cylinder through which the reacting mixture passes from top to bottom in the course of the traverse through the reaction circuit. Preferably the ratio of height to diameter in the reaction zone is from 6:1 to 30:1.

As stated above, the vapors issuing from the emulsifier may contain an appreciable quantity of dialkyl ether produced as a by-product. In accordance with an aspect of this invention, the ether may be recovered by providing the rectifying column with a decanter at the level at which the ether is selectively concentrated. The decanter may be inside or outside of the column. In any event an ether-rich layer forms in the decanter and can be separated for recovery of the ether, for example, by distillation.

FIG. 3 illustrates schematically an industrial embodiment of the invention.

In the apparatus of FIG. 3 the aqueous hydrochloric acid and the alcohol are continuously introduced by pipes 31 and 32, respectively, into a reaction circuit comprising a reactor 33, a vaporizer or emulsifier 35, the lower part of a rectifying column 37, and pipes 34, 36 and 36' between these elements. Reactor 33 is an enlarged portion of the circuit, which enlarged portion is not absolutely necessary for carrying out the process of the invention but is preferred.

The liquid reaction mixture circulates downwards in reactor 33 and upwards in vaporizer 35 which, as explained above, ensures circulation of the liquid through the circuit and thus avoids any need of a circulating pump. However, it is alternatively possible to employ a pump instead of an emulsifier but it is also necessary to heat the liquid in the circuit. Vaporizer 35 is heated by 53.

The vapors evolved in vaporizer 35 are fed together with the non-vaporized liquid to the lower part of the main rectifying column composed of parts 37 and 40 separated by a decanting plate 38. The vapors are fractionated in the column. The non-vaporized liquid is returned from the base of column 37 to reactor 33 by pipe 36'.

The circulation rate of the reaction medium is preferably, per hour, about 10 to about 21 times the volume of reactor 33. The total residence time in the whole of the circuit (which time is defined as being the ratio of the volume of reactor 33 to the volume of alkyl chloride produced per hour) may vary from 4 to 20 hours according to the pressure employed.

Zone 37 in the column prevents hydrochloric acid from distilling off up to decanter 38. Zone 40 is for the separation of the constituents of the mixture, alkyl chloride, alcohol and dialkyl ether.

The vapors leaving the top of the main column by a pipe 47 are introduced into condenser 41. The heterogeneous condensate is decanted in a decanter 43 from which the alkyl chloride produced by the reaction is recovered as an upper layer through a pipe 46. The reaction water and the water of the starting aqueous solution of hydrochloric acid (if such an aqueous solution is employed) is removed by a pipe 45. All the excess condensate which has not been withdrawn through pipe 45 or pipe 46 is refluxed to the top of column 40 by pipes 44 and 44'.

The decanting plate 38, inserted in column 37–40 at a level chosen by reason of the selective concentration of the dialkyl ether, allows this ether to be removed by withdrawing through a pipe 48 a portion of the upper layer formed by the decantation therein and consisting of a mixture of dialkyl ether, alcohol, water, and a proportion of alkyl chloride.

The dialkyl ether is withdrawn by 52 from the foot of a distilling column 50, while the remaining products distilled in this column are returned as vapors by a pipe 49 to column 37.

The following non-limiting examples are given by way of illustration only.

EXAMPLE 1

By pipes 31 and 32, respectively, there was introduced per hour:

12.427 kg. of butanol,
16.7 kg. of 35.3% aqueous solution of hydrochloric acid.

Reactor 33 had a volume of about 400 liters. Its height was 292 centimeters and its inner diameter 42 centimeters. The ratio, height:diameter was about 7:1 accordingly. This reactor worked at a temperature of 101° C., the apparatus being maintained at atmospheric pressure.

The composition of the reaction bath at the equilibrium was as follows:

| | Percent by weight |
|---|---|
| Hydrogen chloride | 16 |
| Water | 40 |
| Butanol | 43 |
| Butyl oxide | 0.5 |
| Butyl chloride | 0.5 |

There was collected per hour:

By pipe 46, 15 kg. of butyl chloride,
By pipe 45, 13.752 kg. of water,
By pipe 52, 0.375 kg. of butyl oxide.

If, for sake of comparison, one operates with a water proportion of 8% and a hydrogen chloride proportion of 4%, it becomes necessary, for reaching the same production rate as aforesaid, to employ a reactor of a volume of 550 liters. Then, the proportion of butyl oxide formed increases from 0.375 to 0.7 kg. per hour; this shows the dehydrating effect of hydrochloric acid when the water content in the bath decreases.

EXAMPLE 2

The operation was the same as in Example 1, except that the apparatus was maintained at a pressure of 1.4 kg./cm.$^2$ above atmospheric pressure. Consequently, the temperature of the bath reached 120° C. and the volume of bath required was only about 80 liters for reaching the same production of butyl chloride as in Example 1. The height of the reactor was 352 centimeters and its inner diameter 17 centimeters. The ratio, height:diameter was about 20:1.

EXAMPLE 3

The operation was the same as in Example 1, except that instead of the hydrochloric acid solution feed, there was fed the corresponding amount of dry hydrogen chloride, i.e. 5.895 kg. per hour of hydrogen chloride. The composition of the bath and the pressure being the same as in Example 1, the production rate was also the same.

The water collected by pipe 45 amounted to 2.972 kg. per hour instead of 13.752 kg.

The production rate of butyl oxide remained the same.

EXAMPLE 4

The apparatus was similar to that used in the foregoing examples, except that the alkyl oxide recovering parts, i.e. decanter 38, pipes 48 and 49 and column 50 with annexes 51 and 52 were omitted.

By pipes 31 and 32, respectively, there was introduced per hour:

13.9 kg. of isopropanol,
21.3 kg. of 35% aqueous solution of hydrochloric acid.

Reactor 33 had a volume of about 400 liters. Its height was 372 centimeters and its inner diameter 37 centimeters. The ratio, height:diameter was about 10:1. This reactor worked at a temperature of 130° C. and a pressure of 3.5 kg./cm.$^2$ above atmospheric pressure.

The composition of the reaction bath at the equilibrium was as follows:

| | Percent by weight |
|---|---|
| Hydrogen chloride | 15 |
| Water | 35 |
| Isopropanol | 50 |

The following mixture was collected per hour by pipe 16:

| | Kg. |
|---|---|
| Isopropyl chloride | 16 |
| Isopropyl oxide | 1 |
| Isopropanol | 0.2 |

The water was discarded by pipe 45 as a mixture of 17.7 kg. of water and 0.3 kg. of isopropanol.

EXAMPLE 5

The apparatus was similar to that of Example 4.
By pipes 31 and 32, respectively, there was introduced per hour:

13.25 kg. of n-hexanol,
3.65 kg. of dry, gaseous hydrogen chloride.

Reactor 33 had a volume of about 300 liters. Its height was 455 centimeters and its inner diameter 29 centimeters. The ratio, height:diameter was about 15:1. This reactor worked at a temperature of 140° C. and a pressure of 4 kg./cm.$^2$ above atmospheric pressure.

The composition of the reaction bath at the equilibrium was as follows:

| | Percent by weight |
|---|---|
| Hydrogen chloride | 15 |
| Water | 33 |
| n-Hexanol | 52 |

The following mixture was collected per hour by pipe 46:

| | Kg. |
|---|---|
| n-Hexyl chloride | 12 |
| n-Hexyl oxide | 1 |
| n-Hexanol | 2 | and by pipe 45, 1.9 kg. of water.

Percentages of hydrogen chloride as referred to in the above examples are dry hydrogen chloride.

What is claimed is:
1. A continuous process for the production and recovery of alkyl chloride containing from three to six carbon atoms by reaction between the corresponding alkanol and hydrochloric acid which comprises passing a vapor-free, liquid reaction mixture containing from about 38% to 60% by weight alkanol, from about 10% to 17% by weight hydrogen chloride and from about 30% to 45% by weight water, all based on the total weight of the mixture, at a temperature of from about 100° C. to 150° C. through a reaction zone while continuously adding fresh reactants to the reaction mixture, partially vaporizing the liquid issuing from said reaction zone, said liquid containing alkyl chloride produced by the reaction, to produce a second liquid and a vapor phase, continuously returning the second liquid, at a temperature of from about 100° C. to 150° C. but in vapor-free state, to the reaction zone and separating alkyl chloride from said vapor phase.

2. A process as in claim 1, in which aqueous hydrochloric acid is fed as a fresh reactant.

3. A process as in claim 1, in which anhydrous hydrogen chloride is fed as a fresh reactant.

4. A process as in claim 1 in which the absolute pressure in the reaction zone is from about 1 to 5 kg./cm.$^2$.

5. A process as in claim 1, in which the vapor phase contains alkyl ether produced in the reaction zone from the alkanol reactant and the same is separated from the other constituents in the vapor phase.

6. A process as in claim 1 in which the alkyl chloride is butyl chloride and the amount of hydrogen chloride in the reaction mixture is from 10% to 17%, by weight.

7. A process as in claim 6 in which the absolute pressure in the reaction zone is from about 1 to 5 kg./cm.$^2$.

8. A process as in claim 1 in which the alkyl chloride is isopropyl chloride and the amount of hydrogen chloride in the reaction mixture is from 10% to 17%, by weight.

9. A process as in claim 8 in which the absolute pressure in the reaction zone is from about 1 to 5 kg./cm.$^2$.

10. A process as in claim 1 in which the alkyl chloride is hexyl chloride and the amount of hydrogen chloride in the reaction mixture is from 10% to 17%, by weight.

11. A process as in claim 10 in which the absolute pressure in the reaction zone is from about 1 to 5 kg./cm.$^2$.

References Cited

UNITED STATES PATENTS 2,847,484   8/1958   Kolker _____ 260—657

DANIEL D. HORWITZ, Primary Examiner

U.S. Cl. X.R.

23—260